United States Patent Office 2,824,857
Patented Feb. 25, 1958

2,824,857

REACTION PRODUCTS OF AN ALKYLENEIMINE AND AN ORGANIC CARBONATE

Erhart K. Drechsel, Springdale, Conn., assignor to American Cyanamid Company, New York, N. Y., a corporation of Maine No Drawing. Application June 28, 1954
Serial No. 439,923

16 Claims. (Cl. 260—77.5)

This invention relates to new and useful compositions of matter, and more particularly is concerned with compositions comprising a reaction product of ingredients comprising (1) an alkyleneimine (a monomeric or a polymeric alkyleneimine), especially a 1,2-alkyleneimine ($\alpha,\beta$-alkyleneimine) wherein the nitrogen atom is unsubstituted, e. g., ethyleneimine, 1,2-propyleneimine, etc., and (2) an organic carbonate, more particularly a cyclic carbonate composed of carbon, hydrogen and oxygen atoms, e. g., ethylene carbonate, propylene carbonate, glycerol carbonate, allyl glycerol carbonate, etc. Still more particularly the invention is concerned with polymerizable compositions comprising a polymerizable reaction product of (1) a 1,2-alkyleneimine wherein the nitrogen atom is unsubstituted and (2) a cyclic carbonate composed of carbon, hydrogen and oxygen atoms, and with products comprising the polymerized composition obtained by polymerization of the aforesaid polymerizable composition. The scope of the invention also includes method features.

The reaction products of this invention are produced by what, to the best of my knowledge and belief, is a new and unique polymerization reaction. It is characterized by the reaction of two ring systems whereby one of them, namely, the organic carbonate, is cleaved by the other while at the same time introducing into the molecule of the initial reaction product a functional group, specifically a hydroxyl group. This initial reaction product of "hydroxyimine" can then react further with other hydroxy-imine molecules to yield a new series of polyurethanes for use in industry. These polyurethanes result from a type of polymerization reaction wherein no volatile products are formed during curing or polymerization (partial or complete polymerization) of the intermediate hydroxy-imine. The advantages of this will be immediately apparent to those skilled in the resin art, and to users of resins in the electrically insulating, adhesive, laminating, textile-treating, paper-treating, paper-additive, surface-coating and other arts.

It was known prior to my invention that synthetic materials (both resinous and non-resinous) could be produced by reaction between an alkyleneimine (monomeric or polymeric) and various other materials. Thus, in U. S. Patent No. 2,257,162 there is described the production of synthetic resins, which are said to be stable against acids and alkalies, by reaction between a monomeric or a polymeric alkyleneimine, specifically monomeric or polymeric ethyleneimine, and an aromatic isocyanate or isothiocyanate. Also, in U. S. Patent No. 2,272,489 it is suggested that the monomeric or polymeric 1,2-alkyleneimines can be caused to react with such compounds as: (1) aliphatic, hydroaromatic or heterocyclic compounds containing reactive halogen atoms, e. g., alkyl chlorides and bromides, fatty acid halides, etc.; (2) carboxylic acids, e. g., stearic, oleic, maleic, etc., acids; (3) alkylene oxides, e. g., ethylene oxide, etc.; and (4) aldehydes and/or ketones, e. g., formaldehyde, acetaldehyde, benbenzaldehyde, acetone, methyl ethyl ketone, etc., and mixtures thereof. Other reaction products in which a 1,2-alkyleneimine is employed as a reactant are shown in U. S. Patent No. 2,596,200, more particularly reaction products of ethyleneimine or other 1,2-alkyleneimine with an $\alpha,\beta$-olefinic carboxylic acid ester of a polyhydric alcohol, e. g., the acrylic, methacrylic or crotonic acid esters of ethylene glycol, propylene glycol or butylene glycol.

To the best of my knowledge and belief, it was not known or suggested, prior to my invention, that ethyleneimine or any other 1,2-alkyleneimine wherein the nitrogen atom is unsubstituted could be reacted with a cyclic carbonate composed of carbon, hydrogen, and oxygen atoms, examples of which have been given hereinbefore, to produce a new class of synthetic materials having particular and peculiar properties that make them especially valuable for use in industry, e. g., in the plastics, coating, paper, textile, adhesive, laminating, and other arts.

Accordingly, it is one of the primary objects of the present invention to provide a new class of polymerizable and polymerized compositions for use in industry, for instance in such arts as have just been mentioned by way of example.

Another important object of the invention is to provide an intermediate reaction product which can be polymerized or resinified without evolving or splitting out volatile products during conversion to its ultimate form.

Still another object of the invention is to provide an intermediate reaction product of the kind mentioned in the preceding paragraph and which is further characterized by the fact that it is stable until final cure or conversion to an insoluble state is desired.

A further object of the invention is to provide a new class of polymeric materials which can be made at a relatively low cost and the properties of which can be widely varied merely by using a different reactant or reactants (of the same general class or classes) in the preparation.

Another object of the invention is to increase the field of utility of ethyleneimine and of other 1,2-alkyleneimines; and, also, of ethylene carbonate and other cyclic carbonates composed of carbon, hydrogen and oxygen atoms.

Other objects of the invention will be apparent to those skilled in the art from the description and examples which follow.

The objects of the invention are accomplished, in general, by reacting ethyleneimine, or other 1,2-alkyleneimine wherein the nitrogen atom in unsubstituted, with ethylene carbonate or other cyclic carbonate composed of carbon, hydrogen and oxygen atoms.

To the best of my knowledge and belief, any 1,2-alkyleneimine (monomeric or polymeric 1,2-alkyleneimine) can be reacted with a cyclic carbonate of the kind used in practicing the present invention to produce an intermediate hydroxy-imine which then can be polymerized to a linear polymer without evolving a volatile by-product. The reaction product of the aforesaid 1,2-alkyleneimine and cyclic carbonate is characterized, when in linear polymeric form, by the fact that it contains reactive terminal groups, one of which is hydroxy and the other of which is the residue of the 1,2-alkyleneimine reactant. Illustrative examples of the 1,2-alkyleneimines ($\alpha,\beta$-alkyleneimines) are:

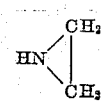

Ethyleneimine

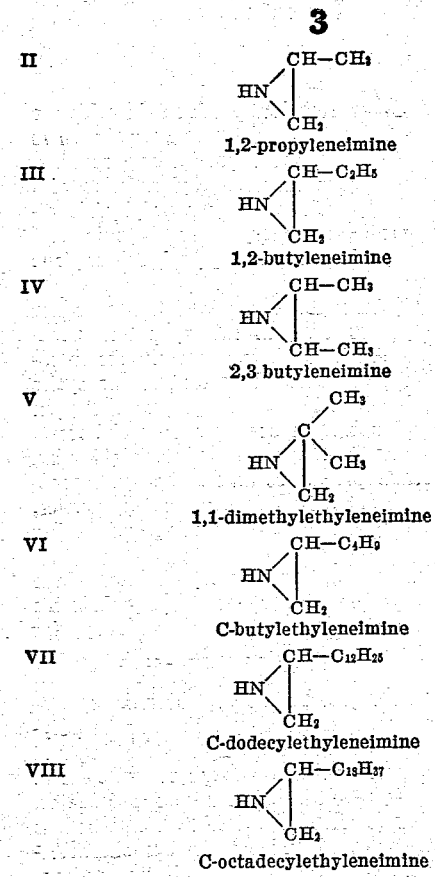

II 1,2-propyleneimine
III 1,2-butyleneimine
IV 2,3-butyleneimine
V 1,1-dimethylethyleneimine
VI C-butylethyleneimine
VII C-dodecylethyleneimine
VIII C-octadecylethyleneimine and polymers of the aforementioned monomeric 1,2-alkyleneimines. Other examples will be apparent to those skilled in the art from the examples just given and their formulas. A preferred class of 1,2-alkyleneimines (monomeric or polymeric 1,2-alkyleneimines) employed in practicing the present invention may be represented, in monomeric form, by the general formula IX
$$HN\diagdown\begin{array}{c}CH-CR\\ |\\ CH-CR'\end{array}$$

where R and R' each represents a member of the class consisting of hydrogen and alkyl radicals, the latter being the same or different but preferably the same.

Likewise, to the best of my knowledge and belief, any cyclic carbonate composed of carbon, hydrogen and oxygen atoms can be reacted with a 1,2-alkyleneimine of the kind used in practicing this invention to produce an intermediate hydroxy-imine which then can be polymerized to a linear polymer without evolving a volatile by product. Illustrative examples of cyclic carbonates that can be used in practicing the present invention are:

X
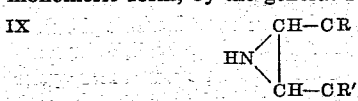
Ethylene carbonate

XI
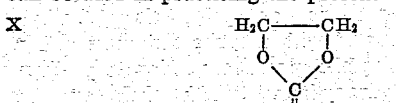
Propylene carbonate

XII
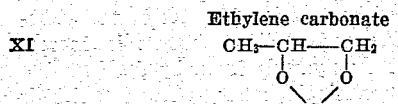
Glycerol carbonate

XIII
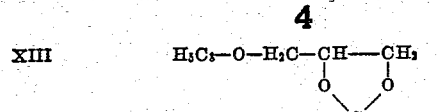

Allyl glycerol carbonate (4-allyloxymethyl-2-oxo-1,3-dioxolane; 4-allyloxymethyl 1,3-dioxolane-2-one; 4-allyloxymethyl-2-keto-1,3-dioxolane)

XIV
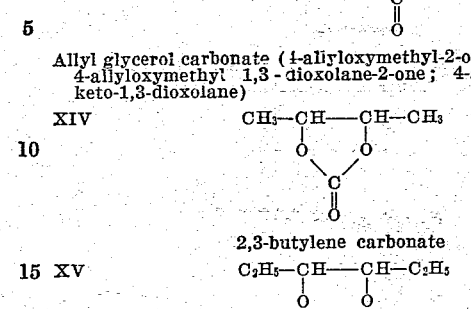
2,3-butylene carbonate

XV
3,4-hexylene carbonate

XVI
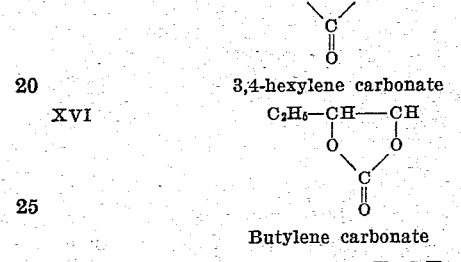
Butylene carbonate

XVII
4,5-octylene carbonate

XVIII
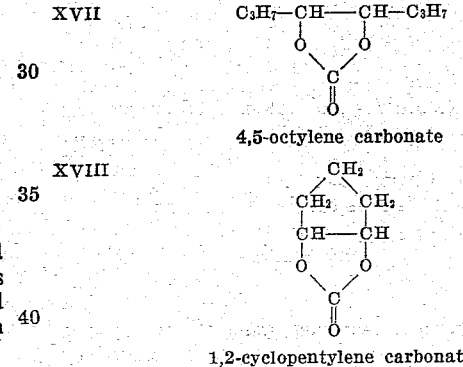
1,2-cyclopentylene carbonate

XIX
1,2-cyclohexylene carbonate

XX
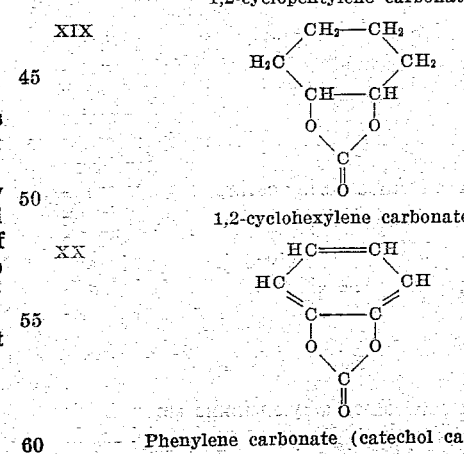
Phenylene carbonate (catechol carbonate)

Other examples of cyclic carbonates composed of carbon, hydrogen and oxygen atoms will be apparent to those skilled in the art from the examples just given and their formulas. One preferred class of cyclic carbonates used in practicing the present invention may be represented by the general formula XXI
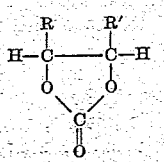

where R and R' each represents a member of the class consisting of hydrogen and alkyl radicals and, when taken together, represent an alkylene radical containing at least two carbon atoms, e. g., —CH$_2$CH$_2$—, —CH$_2$CH$_2$CH$_2$—, —CH$_2$(CH$_3$)CH—, —CH$_2$CH$_2$CH$_2$CH$_2$—
—CH$_2$(CH$_3$)CHCH$_2$—, —CH$_2$CH$_2$(CH$_3$)CH—
—CH$_2$(CH$_3$)$_2$C—, —CH$_2$CH$_2$CH$_2$CH$_2$CH$_2$—
—CH$_2$(CH$_3$)CHCH$_2$CH$_2$—, —CH$_2$(CH$_3$)$_3$C—
—CH$_2$CH$_2$CH$_2$CH$_2$CH$_2$CH$_2$— etc. Another preferred class of cyclic carbonates used in practicing the present invention may be represented by the general formula XXII
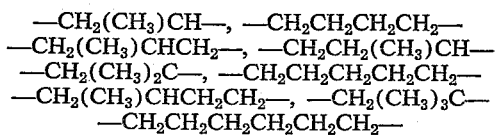

where R'' represents a member of the class consisting of hydrogen and monovalent hydrocarbon radicals. Illustrative examples of monovalent hydrocarbon radicals represented by R'' are: aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert.-butylphenyl, etc.); and aryl-substituted aliphatic (e. g., benzyl, cinnamyl, phenylethyl, phenylpropyl, etc.).

Other examples of cyclic carbonates that can be used are the arylene carbonates, e. g., phenylene carbonate, 2,3- and 3,4-tolylene carbonates, 2,3-o-,-m- and p-xylene, 3,4-o-xylylene carbonates, etc.

In the foregoing illustrative examples of cyclic carbonates it will be noted that the ring oxygen atoms adjacent the carbonyl grouping are each bonded to a ring carbon atom, and that the ring containing the said oxygen and carbon atoms has only three carbon atoms and no carbon-to-carbon unsaturation.

The reaction between a cyclic carbonate and a 1,2-alkyleneimine of the kinds used in practicing the present invention may be illustrated by the following equation, wherein the cyclic carbonate is taken for illustrative purposes as one represented by the general formula XXIII
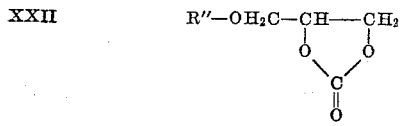

where R''' represents a member of the class consisting of hydrogen and alkyl radicals; and, in which equation, ethyleneimine is taken as illustrative of a 1,2-alkyleneimine:

XXIV
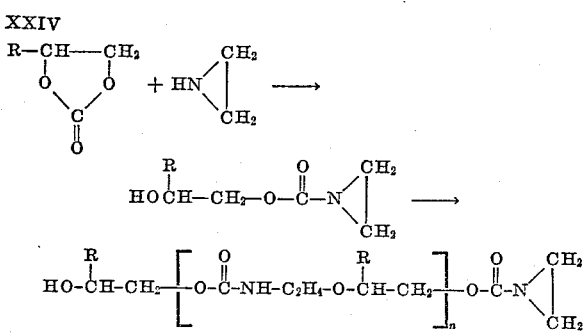

In the foregoing equation n represents a number having an average value of at least 1, and which may range, for instance, from about 5 to about 2,000 or even as high as 5,000 or more.

The initial reaction products of this invention are generally soluble in water, or in other solvents, but become insoluble upon further advancement of polymerization, that is, become substantially cured. Many of the synthetic compositions of this invention, as initially prepared, are thermosetting (or potentially thermosetting) in nature and can be cured under heat in the form of films or moldings without the aid of a curing catalyst.

The proportions of the reactants can be widely varied depending, for example, upon the particular starting reactants employed and the conditions of the reaction. In general, approximately equal molar proportions are employed when a monomeric alkyleneimine is the nitrogenous compound employed. With a polymeric alkyleneimine the proportions are not critical, but in general they are such that at least one —NH$_2$ or

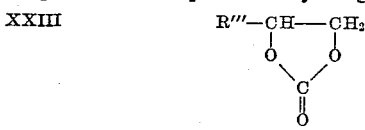

group is present in the molecule for each molecule of cyclic carbonate employed.

The temperature of the reaction also can be varied considerably depending, for instance, upon the particular reactants employed, the rapidity of the reaction wanted, the particular properties desired in the reaction product, and other influencing factors. For example, the reaction temperature can be varied from room temperature (20°–30° C.) up to about 100° C., preferably not higher than about 45° or 50° C. if the reaction can be caused to proceed at the lower temperatures. The reaction mass is cooled, if necessary, in order to keep the temperature thereof to the optimum temperature of reaction.

The reaction can be effected in the absence of a solvent or other additive, or in the presence of (i. e., intimately associated with) a relatively inert solvent, for instance: an aromatic hydrocarbon, e. g., benzene, toluene, xylene, etc.; various oxygenated compounds, e. g., dioxane, diethyl, dipropyl, dibutyl and other dialkyl ethers, 1,2-dimethoxy ethane, 1,2-diethoxy ethane, dialkyl formals and acetals (for instance, diethyl formal, dipropyl formal, dibutyl formal, diethyl acetal, dipropyl acetal, etc.; and various chlorinated compounds, e. g., chloroform, carbon tetrachloride, ethylene dichloride and chlorobenzenes. An excess of the imine reactant over stoichiometrical proportions may constitute the medium in which the reaction is effected. The inert or active liquid medium or additive, if employed, can be used in any suitable amount ranging, for instance, from 0.1 to 40 or 50 times that of the weight of the primary reactants (cyclic carbonate and imine in reactive proportions). Good results have been obtained when the liquid reaction medium was employed in an amount such that the primary reactants constituted from about 25% to about 75% by weight of the reaction mass. At the end of the reaction period, the inert or unreacted liquid medium is then removed from the reaction mass by any suitable means, for example by distillation, decantation, etc., or the solid reaction product can be separated from the liquid component of the reaction mass by filtration, centrifuging, etc.

In order that those skilled in the art may better understand how the present invention can be carried into effect, the following examples are given by way of illustration and not by way of limitation. All parts and percentages are by weight.

*Example 1*

|  | Parts | Approx. Molar Ratio |
|---|---|---|
| Glycerol carbonate | 59.0 | 1 |
| Ethyleneimine | 21.5 | 1 |

The ethyleneimine is added slowly to the glycerol carbonate at room temperature. The reaction is slightly exothermic at room temperature, and after standing for about 2 hours the temperature rises from 28° C. to about 90° C. The temperature then rises rapidly from about 90°–95° C. to 225° C., yielding a polymerization product in the form of a tough, rubbery mass.

Example 2

|  | Parts | Approx. Molar Ratio |
| --- | --- | --- |
| Ethylene carbonate | 44.0 | 1 |
| Ethyleneimine | 21.5 | 1 |

The ethyleneimine is added slowly to the ethylene carbonate at room temperature (20°–30° C.). There is no evidence of an exothermic reaction taking place at room temperature. However, when the reaction mixture is heated in a hot water bath (about 40°–50° C.), the reaction proceeds smoothly as shown by a 7° temperature differential between the temperature of the reaction mass and that of the water bath. After heating for 4 hours, an increase in viscosity is noted, and the clear liquid becomes opaque. After standing for about 16 hours the reaction product is a white, viscous, opaque mass. An electrometric titration indicates that the reaction has proceeded to about 93.5% of completion. The reaction product, at this stage, is still soluble in water. When a sample of the reaction product is heated on a hot plate at about 150° C., it fuses and cures immediately to water-insoluble state without discoloration. The curved product is a hard, white solid at room temperature.

Example 3

|  | Parts | Approx. Molar Ratio |
| --- | --- | --- |
| Allyl glycerol carbonate | 79.0 | 1 |
| Ethyleneimine | 21.5 | 1 |

The same procedure is followed as described in the preceding examples. However, after the reaction mixture has been heated at 40°–50° C. for 4 hours, the temperature is then raised to about 50°–60° C. The reaction proceeds more sluggishly than the reaction between ethyleneimine and ethylene carbonate as evidenced by the fact that after heating for 4 hours at 40°–50° C. there is only a 3° temperature differential between the reaction mass and that of the water bath.

After heating for a total of 7 hours, the reaction product is a clear, viscous liquid which is soluble in alcohols, e. g., methyl, ethyl and propyl alcohols, or in such alcohols diluted with water, but is substantially insoluble in water itself. An electrometric titration indicates that the reaction has proceeded to 57% of completion. On standing, the reaction product increases in viscosity but continues to remain clear.

Example 4

|  | Parts | Approx. Molar Ratio |
| --- | --- | --- |
| Propylene carbonate | 51.0 | 1 |
| Ethyleneimine | 21.5 | 1 |

Essentially the same procedure is followed as described in the preceding examples. The reaction proceeds at about the same rate as does the reaction between ethyleneimine and allyl glycerol carbonate. As in Example 3, so too in this example there is only a 3° temperature differential between the reaction mass and that of the water bath after the reaction mixture has been heated for 4 hours at about 40°–50° C. After heating 7 hours at this temperature, the reaction mass is allowed to stand for about 16 hours at room temperature. At the end of this period of time a strong ammoniacal odor indicates that the reaction is incomplete. The reaction mass is then heated for about 3 hours at 75°–85° C., during which time a viscosity increase is noted. Upon cooling, the product turns opaque. A film cast from a water solution of the product and to which has been added a few drops of acetic acid gives a glossy film upon air-drying. The dried film is extremely hard and mar resistant.

Example 5

|  | Parts | Approx. Molar Ratio |
| --- | --- | --- |
| Phenylene carbonate | 136 | 1 |
| Ethyleneimine | 43 | 1 |
| Dioxane (purified) | 136 |  |

To a solution of the phenylene carbonate (136 parts) dissolved in the dioxane (136 parts), at 25° C., there is gradually added 43 parts of cold (10° C.) ethyleneimine over a period of 1 hour. An exothermic reaction quickly carries the reaction mixture to 35° C., but it is readily controlled (e. g., by immersing the reaction vessel in a water bath) so that the temperature is maintained at 30° C. (plus or minus 3° C.). After all of the ethyleneimine has been added, the reaction mass is stirred for an additional hour while maintaining the temperature at 30°–40° C. During this period a perceptible increase in the viscosity of the solution is noted. When a sample of the resulting solution is cast on a glass or metal plate and allowed to air dry, followed by baking for 15 minutes at 105° C., there is obtained a clear, hard, light-colored film which is resistant to dilute acetic acid solutions.

The reaction product of this example may be used as a component of paints and other coating compositions, or as an adhesive, a laminating composition, or in similar applications where liquid resins or solutions of resins are employed.

Example 6

|  | Parts | Approx. Molar Ratio |
| --- | --- | --- |
| Propylene carbonate | 102 | 3 |
| Polymeric ethyleneimine (average molecular weight: 160–180) | 57 | 1 |
| Diethylformal | 57 |  |

To a solution of 57 parts of the aforementioned polymeric ethyleneimine (a water-soluble polymeric ethyleneimine) dissolved in 57 parts of diethylformal and maintained at 25°–35° C., there is gradually added 102 parts of propylene carbonate over a period of 30 minutes. The exothermic reaction which occurs is readily controlled by immersing the reaction vessel in a cold water bath. A deep amber-colored solution of the reaction product is obtained. This solution is considerably more viscous than the mixture of starting materials, indicating that the reaction has proceeded with a moderate degree of polymerization. The reaction may be accelerated and products of higher viscosity can be obtained by the addition of a small amount of a suitable catalyst, for instance an acid, and more specifically a few drops of an organic acid, e. g., acetic acid.

The reaction product of this example also may be used as a component of paints and other coating compositions, especially where lightness of color is not a matter of primary importance.

Example 7

|  | Parts | Approx. Molar Ratio |
| --- | --- | --- |
| Phenylene carbonate | 132 | 1 |
| 1,2-propyleneimine | 57 | 1 |
| Dioxane | 132 |  |

The procedure is essentially the same as described under Example 5. A viscous solution of the reaction product is obtained. This solution has properties similar to the corresponding product of Example 5, and is suitable for use in coating and other compositions such as were mentioned in Ex. 5 with reference to the product of that example.

*Example 8*

|  | Parts | Approx. Molar Ratio |
|---|---|---|
| Ethylene carbonate | 44 | 1 |
| 1,2-butyleneimine | 71 | 2 |

Essentially the same procedure is followed as described under Example 1. The product is a cationic, water-soluble resinous mass which can be converted to a water-insoluble state by incorporating therein a small amount of an acid, e. g., citric, phthalic, benzoic, acetic, phosphoric, etc., and heating for a few seconds at 110°–130° C. The curable product of this example can be used as a coating or impregnating composition, or as a component of such compositions. It also can be mixed with dyes, pigments, fillers, opacifiers, curing catalysts or accelerators and/or other additives to produce molding compositions of various kinds.

*Example 9*

|  | Parts | Approx. Molar Ratio |
|---|---|---|
| Propylene carbonate | 102 | 1 |
| 2,3-butyleneimine | 71 | 1 |

The procedure is generally the same as that described in Example 4, which, in turn, was essentially the same as that of Examples 1–3. The product has properties which are much the same as the corresponding product of Example 4 and are suitable for similar applications, e. g., as a coating composition or as a component of a coating composition, as well as in adhesive, laminating, impregnating, paper-treating, textile-treating and other applications.

*Example 10*

Same is in Example 8 with the exception that the product is partially neutralized with acetic acid. The resulting product is suitable for use as an alkaline sizing agent in paper manufacture.

It will be understood, of course, by those skilled in the art that my invention is not limited to the specific reactants, proportions thereof and conditions of reactions given by way of illustration in the foregoing examples. Thus, instead of using a single monomeric or polymeric 1,2-alkyleneimine, wherein the nitrogen atom of the monomeric imine is unsubstituted, as a reactant with a single cyclic carbonate composed of carbon, hydrogen and oxygen atoms, one can use a plurality of different 1,2-alkyleneimines (in any proportions) with a single cyclic carbonate or with a plurality of different cyclic carbonates in any proportions; or one can use a plurality of different cyclic carbonates with a single monomeric or polymeric 1,2-alkyleneimine of the kind used in practicing the present invention. Also, instead of the particular 1,2-alkyleneimines and cyclic carbonates employed in the individual examples, one can use, to the best of my knowledge and belief, any other 1,2-alkyleneimine (in monomeric or polymeric form) and wherein the nitrogen atom of the monomeric imine is unsubstituted, or any other cyclic carbonate composed solely of carbon, hydrogen and oxygen atoms, numerous examples of which have been given hereinbefore.

The properties of the fundamental resinous or non-resinous reaction products of this invention can be varied widely by introducing other modifying bodies before, during or after effecting reaction between the primary components. Thus, as modifying agents I may use, for instance, urea and substituted ureas, aminotriazines (e. g., melamine, ammelide, ammeline, etc.), monohydric alcohols, e. g., methyl, ethyl, propyl, isopropyl, butyl, hexyl, n-octyl, 2-ethylhexyl, decyl, dodecyl, cetyl, lauryl, capryl, tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol, and others such as are disclosed, for example, in Schaefer Patent No. 2,481,155; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; phenol and substituted phenols; and the like.

Illustrative examples of other modifying bodies that can be incorporated into the fundamental reaction products, during their preparation or after they have been formed, are melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc.; polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from certain of the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, dated October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, China clay, carbon black, etc.) may be compounded by conventional practice with the synthetic materials of my invention, as desired or as conditions may require, in order to provide a coating, molding or other composition best adapted to meet a particular service use. For additional or more detailed information concerning the modifying ingredients that may be employed in producing coating compositions from my resins, reference is made to the aforementioned Moore patent.

The modified and unmodified reaction products, more particularly resinous reaction products, of this invention have a wide variety of uses. For example, in addition to their use in the production of coating compositions, they may be employed as modifiers of other compatible natural and synthetic resins, including epoxy resins. Thus, some of them advantageously may be used to improve the plasticity or flow characteristics of thermosetting resins which have insufficient or unsatisfactory plasticity during curing to an insoluble, infusible state, e. g., certain urea-formaldehyde or melamine-formaldehyde resins or molding compositions where better flow during molding, without decreasing the cure time, is desirable. The soluble resins of this invention also can be dissolved in appropriate solvents. Some of the solvents that may be employed to dissolve a particular reaction product of my invention include benzene, toluene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with a resin solution, superimposed and thereafter united under heat and pressure. They also can be employed as an adhesive in making laminated plywood, laminated glass cloth, as an impregnant of pulp preforms from which molded articles thereafter are made by subjecting the impregnated preforms to heat and pressure, as beater-additives in making paper, as impregnants for electrical coils and for other electrically insulating applications, for bonding together abrasive grains in the production of resin-bonded abrasive articles such, for instance, as grindstones, sand papers, etc., in the manufacture of electrical resistors, as potting compounds, etc. They also can be used for treating textile materials (e. g., linen, rayon, and other cellulose-containing textiles, wool, silk, and other natural or synthetic proteinaceous textiles, including nylon and textiles derived from polyacrylonitrile and acrylonitrile copolymers, and from casein, soyabeans, etc.), in filament, thread, yarn, fabric (woven or felted) or other forms, in order to improve the properties of such textile materials, e. g., to increase the stiffness, to increase the service life, to impart shrinkage resistance thereto, or otherwise to enhance the properties of the treated materials and to make them more useful or serviceable to the ultimate user. They also may be employed for treating leather to improve its appearance and physical properties.

The fiber-forming (high-molecular-weight) polymers of this invention also can be used in the production of continuous-filament (monofilament and multifilament) threads or yarns, tow, and staple fibers, from all of which useful articles of manufacture, e. g., fabrics, can be made.

I claim:

1. A composition comprising a product of reaction, at a temperature of from about 20° C. to about 100° C. of ingredients comprising (1) a 1,2-alkyleneimine wherein the nitrogen atom is unsubstituted and (2) a cyclic carbonate composed of carbon, hydrogen and oxygen atoms, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of an alkyleneimine corresponding to the alkyleneimine of (1).

2. A product of reaction, at a temperature of from about 20° C. to about 100° C., of ethyleneimine and a cyclic carbonate composed of carbon, hydrogen and oxygen atoms, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

3. A product of reaction, at a temperature of from about 20° C. to about 100° C., of ethyleneimine and glycerol carbonate, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

4. A product of reaction, at a temperature of from about 20° C. to about 100° C., of ethyleneimine and ethylene carbonate, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

5. A product of reaction, at a temperature of from about 20° C. to about 100° C., of ethyleneimine and allyl glycerol carbonate, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

6. A product of reaction, at a temperature of from about 20° C. to about 100° C., of ethyleneimine and propylene carbonate, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

7. A polymerizable linear composition comprising a polymerizable product of reaction, at a temperature of from about 20° C. to about 100° C., of (1) a 1,2-alkyleneimine wherein the nitrogen atom is unsubstituted and (2) a cyclic carbonate composed of carbon, hydrogen and oxygen atoms, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of an alkyleneimine corresponding to the alkyleneimine of (1).

8. A product comprising the polymerized composition of claim 7.

9. A polymerizable linear composition comprising a polymerizable product of reaction, at a temperature of from about 20° C. to about 100° C., of ethyleneimine and a cyclic carbonate composed of carbon, hydrogen and oxygen atoms, and wherein the ring oxygen atoms adjacent the carbonyl grouping are each bonded to a ring carbon atom, the ring containing the said oxygen and carbon atoms having only three carbon atoms and no carbon-to-carbon unsaturation, and the said reaction product in linear polymeric form being characterized by the fact that it contains reactive terminal groups, one of which is hydroxy and the other of which is the residue of ethyleneimine.

10. A product comprising the polymerized composition of claim 9.

11. The process which comprises reacting, at a temperature of from about 20° C. to about 100° C., a 1,2-alkyleneimine, wherein the nitrogen atom is unsubstituted, with a cyclic carbonate composed of carbon, hydrogen and oxygen atoms, and wherein the ring oxygen atoms adjacent the carbonyl grouping are each bonded to a ring carbon atom, the ring containing the said oxygen and carbon aoms having only three carbon atoms and no carbon-to-carbon unsaturation.

12. The process which comprises reacting, at a temperature of from about 20° C. to about 100° C., ethyleneimine with a cyclic carbonate composed of carbon, hydrogen and oxygen atoms, and wherein the ring oxygen atoms adjacent the carbonyl grouping are each bonded to a ring carbon atom, the ring containing the said oxygen and carbon atoms having only three carbon atoms and no carbon-to-carbon unsaturation.

13. The process which comprises reacting, at a temperature of from about 20° C. to about 100° C., ethyleneimine and glycerol carbonate.

14. The process which comprises reacting, at a temperation of from about 20° C. to about 100° C., ethyleneimine and ethylene carbonate.

15. The process which comprises reacting, at a temperature of from about 20° C. to about 100° C., ethyleneimine and allyl glycerol carbonate.

16. The process which comprises reacting, at a temperature of from about 20° C. to about 100° C., ethyleneimine and propylene carbonate.

References Cited in the file of this patent

UNITED STATES PATENTS

| | | |
|---|---|---|
| 2,325,552 | Schleck | July 17, 1943 |
| 2,448,767 | Carlson | Sept. 7, 1948 |

FOREIGN PATENTS

| | | |
|---|---|---|
| 961,754 | France | Nov. 28, 1949 |
| 711,408 | Germany | Oct. 1, 1941 |

OTHER REFERENCES

Carothers: Collected Papers, Interscience, 1940, pp. 221 to 225. (Copy in Sci. Libr.)

U. S. DEPARTMENT OF COMMERCE
PATENT OFFICE
CERTIFICATE OF CORRECTION

Patent No. 2,824,857                                              February 25, 1958

Erhart K. Drechsel

It is hereby certified that error appears in the printed specification of the above numbered patent requiring correction and that the said Letters Patent should read as corrected below.

Column 1, line 71, strike out "ben-"; column 2, line 67, for "alkyleneimine" read -- alkyleneimines --; column 3, line 55, after "by" insert a hyphen; column 7, line 26, for "curved" read -- cured --; column 9, line 63, for "diflerent" read -- different --; column 12, line 60, for "a" read -- A --; column 13, line 10, for "aoms" read -- atoms --.

Signed and sealed this 15th day of April 1958.

(SEAL)

Attest:
KARL H. AXLINE                                                  ROBERT C. WATSON
Attesting Officer                                         Commissioner of Patents